United States Patent [19]

Wagner

[11] 4,122,049

[45] Oct. 24, 1978

[54] PROCESS FOR THE PRODUCTION OF POLYURETHANE FOAM

[75] Inventor: Kuno Wagner, Leverkusen, Germany

[73] Assignee: Bayer Aktiengesellschaft, Leverkusen, Germany

[21] Appl. No.: 851,084

[22] Filed: Nov. 14, 1977

Related U.S. Application Data

[63] Continuation of Ser. No. 667,324, Mar. 16, 1976, abandoned.

[30] Foreign Application Priority Data

Apr. 3, 1975 [DE] Fed. Rep. of Germany ....... 2514633

[51] Int. Cl.$^2$ ................ C08G 18/54; C08G 18/14
[52] U.S. Cl. ................ 521/136; 260/849; 521/122; 521/123
[58] Field of Search ............ 260/2.5 BE, 849

[56] References Cited

U.S. PATENT DOCUMENTS

| 2,976,261 | 3/1961 | Wagner | 260/52 |
| 3,304,273 | 2/1967 | Stamberger | 260/2.5 BE |

FOREIGN PATENT DOCUMENTS

| 997,334 | 7/1965 | United Kingdom | 260/2.5 BE |
| 1,173,627 | 12/1969 | United Kingdom | 260/2.5 BE |

*Primary Examiner*—C. Warren Ivy
*Attorney, Agent, or Firm*—Gene Harsh; Joseph C. Gil; R. Brent Olson

[57] ABSTRACT

The instant invention is directed to a process for the production of polyurethane foams wherein organic polyisocyanates are reacted with active hydrogen containing compounds, wherein either the polyisocyanate or the active hydrogen containing compound or both are used in the form of sedimenting, redispersible dispersions containing homogeneous i.e. non-foamed aminoplast /condensates as the dispersed phase.

4 Claims, No Drawings

PROCESS FOR THE PRODUCTION OF POLYURETHANE FOAM

This is a continuation of application Ser. No. 667,324 filed Nov. 16, 1976 now abandoned.

BACKGROUND OF THE INVENTION

U.S. Application Ser. No. 464,099, filed Apr. 25, 1974 relates to a process for the production of polyurethane foams in which modified polyhydroxyl compounds are reacted with polyisocyanates in the presence of blowing agents and optionally in the presence of further additives generally known in the art. These modified polyhydroxyl compounds are dispersions of aminoplast condensates in organic polyhydroxyl compounds, the aminoplast condensates being produced by the oligocondensation or polycondensation of substances capable of forming aminoplasts in the organic polyhydroxyl compounds as reaction medium. Polyhydroxyl polyethers having a molecular weight in the range from 250 to 14,000 are preferably used as the reaction medium. The dispersions used as modified polyhydroxyl compounds in accordance with Ser. No. 464,099 are stable products without any tendency towards sedimentation.

DESCRIPTION OF THE INVENTION

It has now surprisingly been found that sedimenting dispersions of homogeneous i.e. non-foamed aminoplast condensates in compounds having at least two isocyanate-reactive hydrogen atoms and molecular weights in the range from 400 to 10,000 and/or in polyisocyanates are also suitable for use as starting materials for the production of polyurethane foams having valuable properties.

Accordingly, the present invention relates to a process for the production of foams by reacting polyisocyanates with compounds containing at least two isocyanate-reactive hydrogen atoms and having molecular weights in the range from 400 to 10,000 in the presence of blowing agents known per se and optionally in the presence of compounds having at least two isocyanate-reactive hydrogen atoms and molecular weights in the range of from 32 to 400 and optionally in the presence of foaming auxiliaries and additives known in the art, distinguished by the fact that the polyisocyanates and/or the compounds having at least two isocyanate-reactive hydrogen atoms and molecular weights in the range from 400 to 10,000 are used in the form of sedimenting, redispersible dispersions containing aminoplast condensates as the dispersed phase.

The invention also relates to the polyurethane foams obtained by this process.

In the context of the invention, aminoplasts include any oligocondensation and polycondensation products of the type which may be obtained in known manner by the oligocondensation or polycondensation of carbonyl compounds and more especially formaldehyde, with nitrogen compounds reacting with carbonyl compounds by oligocondensation or polycondensation, preferably through intermediate stages containing N-alkylol groups, and more especially N-methylol groups. Aminoplasts of this type and condensation reactions of this kind which result in their formation are known and are described, for example, in Houben-Weyl, Methoden der organischen Chemie, Vol. XIV, page 2 (1963), Georg Thieme-Verlag, Stuttgart, pages 319–402. In the context of the invention, aminoplasts also include mixed condensates of nitrogen compounds of the above type and nitrogen-free compounds, such as phenols or phenol derivatives, with carbonyl compounds, such as formaldehyde, the phenols or phenol derivatives being used in quantities of up to 60% by weight, based on the sum of nitrogen compounds and phenols.

Accordingly, suitable starting compounds include any nitrogen compounds capable of forming aminoplasts such as, polycarboxylic acid polyamides, urethanes, polyurethanes, ureas, thioureas, biurets, amidines, guanidines, melamines, aryl amines, ammonia, (especially in combination with quinones, such as benzoquinone, as carbonyl compounds) hydrazines, hydrazide and similar nitrogen compounds capable of forming aminoplasts.

Some typical examples of suitable compounds of this kind include urea; diureas such as, for example, hexamethylene diurea, tetramethylene diurea, ethylene diurea, acetylene urea or dimethyl acetylene urea; oxalic acid diamide; succinic acid diamide; adipic acid diamide; mono- or bis-hydrazides; hydrazodicarbonamide; carbacic acid esters; hydrazodicarboxylic acid esters; mono urethanes; diurethanes such as the reaction products of aliphatic, cycloaliphatic, araliphatic and aromatic mono- or bis-chloroformic acid esters with ammonia and primary amines; melamine; dicyanodiamide; cyanamide; aminoguanidine; dicyanodiamidine; guanamines; guanazoles and polyureas of the type obtained by reacting aliphatic, cycloaliphatic, araliphatic di- or triisocyanates and biuret polyisocyanates with ammonia or primary amines.

To prepare the redispersible aminoplast condensates, the nitrogen compounds are either reacted with carbonyl compounds, such as formaldehyde or formaldehyde donors, or with compounds containing N-alkylol groups, preferably N-methylol groups, corresponding to the nitrogen compounds or the corresponding $C_1$-$C_4$ alkyl ethers of these N-alkylol derivatives. The carbonyl compounds and N-alkylol group containing compounds may be used either individually or in combination.

Other eminently suitable nitrogen compounds include relatively high molecular weight $\alpha,\omega$-diureas and/or their N-methylol compounds and/or N-methylol alkyl ethers and/or $\alpha,\omega$-bis-alkoxy methyl urethanes which, between the functional groups in the $\alpha,\omega$-position, contain polyether, polythioether, polyacetal, polyester, polyester amide or polycarbonate radicals having an average molecular weight of from 400 to 10,000 and, optionally, urethane or substituted urea groups. These relatively high molecular weight nitrogen compounds may optionally be reacted together with the already mentioned low molecular weight nitrogen compounds. Particularly preferred relatively high molecular weight nitrogen compounds capable of forming aminoplasts are water-soluble or water-dispersible compounds, such as compounds which, between the functional groups in the $\alpha,\omega$-position, contain polyethylene oxide radicals or radicals of copolymers of ethylene oxide with propylene oxide or tetrahydrofuran, or residues of water-soluble polyacetals produced from di-, tri- or tetra-ethylene glycol and formaldehyde.

Although the already mentioned N-compounds capable of forming aminoplasts or their low molecular weight N-methylol compounds represent the preferred starting materials, it may nevertheless be of advantage to modify the preferred starting materials with other compounds capable of formaldehyde condensation because, in this way, it is possible to vary C/O/N-ratios of the condensates. Adhesion, the physical properties of the isocyanate polyaddition products obtained from them, such as their hardness, their swellability, their water retention capacity, their resistance to rotting, their resistance to oil and petrol, their water-absorbing capacity, their biocidal, bactericidal and fungicidal stability and activity, in accordance with the particular applications envisaged may accordingly be raised. Examples of modifying compounds are compounds which may be incorporated quickly and easily be co-condensation and include polyurethanes and polyureas having terminal NH$_2$-groups; polyamides of poly-($\beta$-aniline) having molecular weights of up to 2000; N-methylol methyl ethers of polycaprolactam; polythiolactams; polypeptides of N-carboxy-$\alpha$-aminocarboxylic acids; low molecular weight polyamides of aliphatic dicarboxylic acids and diamines; polyamides of cycloaliphatic components and aromatic components; polyamides containing O- and S- or N- as hetero atoms; polyester amides; co-condensates which, in addition to amide-groups, also contain ester, urethane or urea groups; ethoxylated and propoxylated monoamides and polyamides; polyhydrazides and polyaminotriazoles; polysulphonamides; phenol-formaldehyde co-condensates with urea, melamine and dicyanodiamide; low molecular weight aniline-formaldehyde condensates; sulphonic acid amides; mononitriles and dinitriles; acrylonitrile; urotropin; hexahydrotriazines of primary amines and formaldehyde; Schiff's base and ketimines or polyketimines (for example of 1 mol of hexamethylene diamine and 2 mols of cyclohexanone); polyaddition products and polycondensation products of melamine and other amino heterocycles with aldehydes and alcohols; polyaddition and polycondensation products of nitriles with aldehydes; and, reaction products of phosphorous acid and phosphine with carbonyl compounds. It can also be of advantage to incorporate stilbene compounds containing groups having a tendency towards N-methylol formation. Other useable materials include compounds containing an unsubstituted sulphonamide group in their molecule, in proportions of from 0.5 to 20%; 1,3,5-tri-(4'-sulphamyl phenylamino)-triazine; melamine-monomethylene-acrylamide; ureido- and thioureido-compounds having an optionally substituted vinyl group and an alkylated methyl group as described in German Pat. No. 1,018,413; N-cycloalkyl-N'-dialkyl ureas; alkylene ethers of salicyclic acid amide; benzene sulphonic amide; reaction products of methoxy methyl isocyanate with mono-, di- and poly-amines; carbaminyl amides as described in German Pat. No. 943,329; N-dicarboxylic acid monoureides; esters of $\alpha$-olefin-N-dicarboxylic acid monoureides as described in German Pat. No. 1,005,057; addition products and condensation products of carbonyl compounds and hydrazine carboxylic acid esters; 2-hydrazino-4,6-bis-diethylamino-1,3,5-triazine; monomethoxy dithiocyano triazine; ethyl aminodithiocyano triazine; substituted acid hydrazides of isopropyl hydrazine and stearic acid; 2-aminothiazole; 2-aminotriazol; dichloromaleic imide; reaction products of 1 mol of methoxy methyl isocyanate and 1 mol of trimethylol aminomethane; addition products and condensation products of N-carbonyl sulphamic acid chloride with ammonia; primary amines; maleic acid hydrazide, hydrazodicarboxylic acid diethyl ester; hydrazodicarbonamide; hydroxyet-yl urethane; phenyl hydrazine; bisbiguanides; aminoguanidine; disodium ethylene-bis-dithiocarbamates; phosphoric and phosphorous acid amides; acyl aminoguanidine; benzoyl-dicyanodiamide; 1,3-disubstituted 5-amino-1,2,4-triazoles as described in German Pat. No. 1,241,835; maleic acid monoamides; polyureas of the type obtainable by the action of ammonia and monoamines on the isocyanatoaryl esters of phosphoric, thiophosphoric, phosphonic, thiophosphonic acids as described in German Pat. No. 1,129,149; mixtures of 1,3-dimethylol-5-alkyl hexahydro-1,3,5-triazone-(2) and methylol ureas as described in German Pat. No. 1,133,386; condensation products of dicyanodiamide and nitriles such as 2,6-diamino-4phenyl-1,3,5-triazine(=benzoguanamine); isobutylidene diurea; $\alpha$-chloroisobutylidene diurea; methacrylamido-benzene sulphonic acid-(N-methane sulphonyl)-amide; dimethylol glyoxal monoureine; dithioureas of the type obtainable by reacting ammonia or primary amines with isothiocyanates as described in German Pat. No. 1,241,440; isourea ethers and iso-biuret ether derivatives as described in German Pat. No, 1,240,844; cyanosubstituted aliphatic ureas of the type obtainable by reacting ammonia with cyano substituted aliphatic isothiocyanates as described in German Pat. No. 1,121,606; low molecular weight co-condensates of melamine, urea, dicyanodiamide and thiourea; methylolated polyureidopolyamides of the type obtainable from $\epsilon$-caprolactam, diethylene triamine and subsequent urea-condensation and formaldehyde-addition as described in German Pat. No. 1,034,857; aminoplast resins of dicyanodiamide, formaldehyde and formic acid as described in German Pat. No. 1,040,236; condensation products of primary amines, epichlorhydrin and urea; condensation products of the type obtained by reacting sulphomethylated phenols and mono-, di- or tri-methylol urea or methylol compounds of acid amides; ethoxylation products of diethylene triamine; water-soluble hexamethylol-melamine condensates and their reaction products with epichlorhydrin; low molecular weight urea-phenol co-condensates; N,N'-dimethylol urone; methylene-bis-methylol urone methyl ethers; melamine and ammeline co-condensates; condensation products of trimethylol phosphine oxide and methylol melamine; co-condensates of melamine, formaldehyde and polyamines of the type described in German Pat. No. 1,059,659; methylol-group-containing co-condensates of 1 mol of benzoguanamine, 3 mols of melamine and 5 mols of formaldehyde; co-condensates of dicyanodiamide and naphthalene sulphonic acids condensed with formaldehyde; water-soluble condensation products of tri- and tetra-methylol melamine which may optionally be modified with other compounds capable of forming aminoplasts; methylol-group-containing co-condensates of melamine, urea, guanidine, dicyanodiamide, formaldehyde and malonic acid diethyl ester; water-soluble resin-like condensation products of 1 mol of urea and 1 to 2 mols of acrylic acid or methacrylic acid, alkylene dimelamines of the type obtainable by reacting dicyanodiamide with cyano amino nitriles in the presence of KOH; condensation products of mono- and di-methylol urea or thiourea with glyoxal; modified carbamidomethylol ethers as described in German Pat. No. 1,017,787, for example those of urea, melamine, butanol and methacrylic acid; reaction products of formaldehyde condensation products of compounds belonging to the aminotriazine group or to the urea group which contain free N-methylol groups, with nitriles or amides of unsaturated polymerizable or copolymerizable acids as described in German Pat. No. 1,005,270; methylol-group-containing vinyl-oxyalkyl melamines; methylol compounds of reaction products of diisocyanates with 1 mol of ethylene imine and 1 mol of ammonia or primary amines; methacryl amide and acrylamide methylol methyl ethers; methylol compounds of N-vinyl derivatives of N,N'-alkylated cyclic ureas, such as N-vinyl-N,N'-ethylene urea; methylol compounds of amides of phosphoric and thiophosphoric acid; methylol compounds of biguanides; methylol-group-containing addition products of carbamic acid esters and glyoxal; methylol-group-containing mercapto fatty acid hydrazides of thioglycolic acid methyl ester and hydrazine; formamide; tert-butyl formamide; polyureas of tetraethylene pentamine and urea; methylol-group-containing quaternary ammonium derivatives of aminoaceto guanamine as described in German Pat. No. 1,032,259; N-methylol compounds of biuret and N-alkylated biuret derivatives; benzene sulphoallyl amide; methanosulphoallyl amide; dimethylaminosulphoallyl amide; methylol compounds of hydantoin and derivatives thereof; methylol compounds of salicyclic acid amides, such as 5-chloro-2-hydroxy benzene-1-carboxylic acid-n-amyl amide, dichloro-phenoxy acetic acid amides, 2-amino-4-(ethylthio)-butyric acid, 2-amino-4-methoxy butyric acid, 2-amino-4-(methyl sulphonyl)-butyric acid which are active against fungi, viruses, bacteria and other parasitic organisms and which may be fixed in the end products of the process initially through formaldehyde condensations; and, methylol compounds of low molecular weight condensation products of cyclic lactim-O-alkyl ethers, such as butyrolactim ether, valerolactim ether, caprolactim ether with monoacylated hydrazines or urea, thiourea, bis-hydrazides and semicarbazide.

The above-mentioned relatively high molecular weight nitrogen compounds capable of forming aminoplasts may with advantage be used in a quantity of from 0 to 40% by weight, based on the low molecular weight compounds capable of aminoplast formation.

Other suitable compounds capable of forming aminoplasts include, polyfunctional N-formyl compounds or acetyl compounds such as, for example, those of hydrazine, N-methyl hydrazine, N,N-dimethyl and diethyl hydrazine, ethylene diamine, trimethylene diamine, 1,2-diaminopropylene diamine, tetramethylene diamine, N-methyl-1,3-propylene diamine, pentamethylene diamine, trimethyl hexamethylene diamine, hexamethylene diamine, octamethylene diamine, undecamethylene diamine, diaminomethyl cyclobutane, 1,4-diaminocyclohexane, 1,4-diamine dicyclohexyl methane, 1-methyl-2,4-diamino cyclohexane, 1-methyl-2,6-diaminocyclohexane, m-xylylene diamine, 1-amino-3,3,5-trimethyl-5-aminomethylcyclohexane, p-aminobenzyl amine, 3-chloro-4-aminobenzyl amine, hexahydrobenzidine, 2,6-dichloro-1,4-diaminobenzene, p-phenylene diamine, 2,4-tolylene diamine, 1,3,5-triisopropyl-2,4-phenylene diamine, 1,3,5-trimethyl-2,4-phenylene diamine, 1-methyl-3,5-diethyl-2,4-phenylene diamine, 1-methyl-3,5-diethyl-2,6-phenylene diamine, 4,4'-diaminodiphenyl methane and 4,4-diaminodiphenyl ether.

However, the above-mentioned formylated polyamines are also valuable compounds capable of aminoplast formation in non-acylated form, i.e., in the form of free polyamines, since they may be reacted, in particular with formaldehyde, to form highly crosslinked polyhexahydro triazine condensates.

It has proved to be particularly valuable to use from 0.5 to 30% by weight based on the total quantity of starting compounds capable of aminoplast formation, of chain terminators. Reference is made in particular to lactams such as ε-caprolactam, valerolactam, butyrolactam and the corresponding thiolactams. However, other mono-functional compounds such as, for example, formamide or acetamide or even polyalcohols such as glycerol, cane sugar, ethylene glycol, diethylene glycol and triethylene glycol, may also be used for chain-terminating reactions for controlling the viscosity properties of the dispersions. It is preferred to use ε-caprolactam as the chain terminator. In the production of polymethylene ureas for example, it is possible in this way to obtain poly-homologue series of methylene-attached polycondensates containing terminal lactam units and corresponding to the formula:

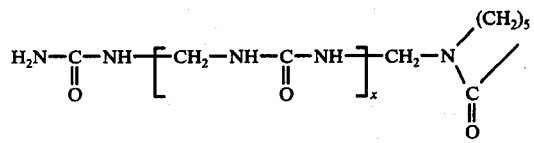

in which $X = 4$–$20$.

For chain regulation of, for example, polymethylene urea, polymethylene thiourea and polymethylene melamine condensations (and their products crosslinked by excess formaldehyde) it may also be of advantage to use the following compounds as chain terminators in quantities of from 0.5 to 30% by weight, based on solids: 2,4-dichlorophenoxy acetic acid amides, such as the N-methyl amide, N-ethyl amide, and N-butyl amide; 2-methyl-4-chlorophenoxy acetic acid and its amide and N-substituted amides; 4-(2,4-dichlorophenoxy)-butyric acid; trichloro-acetic acid amide; 2,2-dichloropropionic acid; 2,2-dichloropropionic acid amide; the N-methylol compounds of 2,2-dichloropropionic acid amide; 2,2-dichloropropionic acid amide-N-methylol methyl ether; chloroacetic acid diallyl amide; urethanes such as N-(3-chlorophenyl)-carbamic acid isopropyl ester; N-(4-chlorophenyl)-N,N'-dimethyl urea; urethanes or aromatic isocyanates (optionally containing several chlorine atoms) with isopropanol or methyl isocyanate and isopropanol; halogen-containing triazines such as 2-chloro-4,6-bis-ethyl amino-s-triazine; formyl compounds of amino guanidine; imidazole; 2-methyl imidazole; benzimidazole; mercapto benzimidazole; 3-amino-triazole; N-cyclohexyl-N',N'-dimethyl urea; disodium ethylene-bis-dithiocarbamate; 5-chloro-2-hydroxy benzene-1-carboxylic acid-n-amyl amide; the methylol compound of 5-chloro-2-hydroxy benzene-1-carboxylic acid amide; and N-methylol compounds of the type which may be obtained from the chloroformic acid ester of hexachloroisopropanol with ammonia, followed by the action of formaldehyde.

Generally, the term "chain terminators" as used herein will include any compounds which contain only one group taking part in the condensation reaction leading to aminoplast formation.

In one particularly interesting embodiment, formation of the aminoplast condensates may be carried out in combination with the formation of finely divided polysilicas, titanium dioxide, antimony trioxide and aluminum silicates, in which case interesting, reactive combination fillers are obtained, which may be readily redispersed both in polyhydroxyl compounds and in polyisocyanates (cf. Example 3, embodiment (b), (c) and (e)).

In one particular embodiment of the condensation reaction, compounds of the type which, in addition to groups capable of aminoplast formation, also contain groups (for example chromophoric groups) which provide these starting materials with the properties of dyes and/or lighteners, are used in quantities of from 0.5 to 20% by weight and preferably in quantities of from 2 to 14% by weight, based on the total quantity of the aminoplast-forming starting compounds. By incorporating compounds of this kind, it is possible to produce dyed and extremely color-stable dispersions which also impart these properties to the polyurethane plastics produced from them.

Examples of compounds such as these are lighteners of the formula:

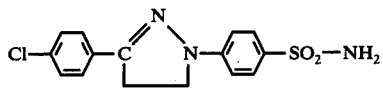

or

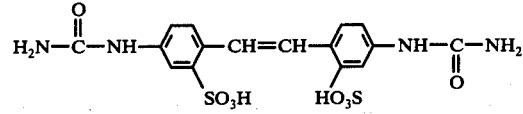

Aminoplast formation is carried out by reacting the above-mentioned starting materials, providing they contain an inadequate number of reactive alkylol and-/or alkylol ether groups for polycondensation, with carbonyl compounds, i.e. in particular aldehydes or ketones. Examples of carbonyl compounds inlcude formaldehyde, acetaldehyde, butyraldehyde, cyclohexane aldehyde, benzaldehyde, salicyl aldehyde, 4-methyl benzaldehyde, terephthalic dialdehyde, glyoxal, acetone, diethyl ketone, cyclohexanone, benzophenone or even quinones, such as benzoquinone, as reactant for ammonia.

It is preferred to use formaldehyde in aqueous solution or even in gaseous form, or any formaldehyde donors or compounds reacting in the same way as formaldehyde, such as its semi-acetals with monofunctional or polyfunctional alcohols, such as methanol, ethanol, butanol, ethylene glycol, diethylene glycol and the like; acetaldehyde; chloral; acetone; methyl ether ketone; methyl isobutyl ketone; or cyclohexanone. It is particularly preferred to use aqueous formaldehyde.

In addition to the compounds preferably used for aminoplast formation, it is also possible, as already mentioned, to use for modifying the condensates so-called compounds capable of "phenoplast formation" in a quantity of from 0.5 to 60% by weight and preferably in a quantity of from 5 to 40% by weight, based on the total quantity of the aminoplast-forming starting compounds, without any reduction in the condensation velocity. It is possible in this way to considerably modify the aminoplast condensates and to control the viscosity properties of the dispersions used in accordance with the invention. Preferred substances capable of phenoplast formation are phenol, bisphenol, resols of phenol or bis-phenol and formaldehyde, condensation products of phenol and cyclohexanone, phenol sulphonic acid, naphthalene sulphonic acids and the like.

Aminoplast formation may be activated by any known condensation catalysts including formic acid, hydrochloric acid, sulphuric acid, phosphoric acid, acetic acid, thioacetic acid and maleic acid; bases such as sodium hydroxide, potassium hydroxide, calcium hydroxide or barium hydroxide; zinc oxide; magnesium oxide; phosphoric acids; phosphates; primary and secondary potassium hydrogen phosphate; ammonium sulphate; numerous organic acid anhydrides; acid-liberating compounds such as ammonium chloride; trimethyl ammonium formate; chloral hydrate; amine salts of formic acid and other organic carboxylic acids; maleic acid semiesters; tertiary amine salts; dibenzoyl peroxide; carbonic acid; N-carbamic acids; glycol chlorohydrin; glycerol chlorohydrin; epichlorhydrin; a variety of different copper, zinc, Sn(II), cadmium and magnesium salts of organic acids. A variety of different metal oxides or their hydrates may also be used.

Preferred activators are hydrochloric acid, sulphuric acid, phosphoric acid, phosphorous acid, formic acid, maleic acid, sodium hydroxide, potassium hydroxide, barium hydroxide, benzyl dimethyl amine and triethyl amine.

The activators are generally used in quantities of from 0.05 to 5% by weight and preferably in quantities of from 0.1 to 2% by weight, based on the total quantity of all the reaction components involved in polycondensation.

Production of the aminoplast condensates may be carried out, in water and/or other inert media, such as alcohols (e.g. methyl alcohol, ethyl alcohol or propyl alcohol). The production of aminoplast condensates of this type is generally known.

After they have been produced and, optionally separated off from the reaction medium, the aminoplast condensates may be dried and purified in known manner. They are subsequently dispersed, again in known manner, in the polyisocyanate and/or in the compound having at least two isocyanate-reactive hydrogen atoms and a molecular weight in the range from 400 to 10,000.

Suitable polyisocyanates include aliphatic, cycloaliphatic, araliphatic, aromatic or heterocyclic polyisocyanates of the type known in the art and described for example by W. Siefken in Justus Leibigs Annalen der Chemie, 562, pages 75 to 136; specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanatomethyl-cyclohexane (German Auslegeschrift No. 1,202,785; U.S. Pat. No. 3,401,190); 2,4- and 2,6-hexahydrotolylene diisocyanate and mixtures of these isomers; hexahydro-1,3- and/or 1,4-phenylene diisocyanate; perhydro-2,4'- and/or 4,4'-diphenyl methane diisocyanate; 1,3- and 1,4-phenylene diisocyanate; 2,4- and 2,6-tolylene diisocyanate, and mixtures of these isomers; diphenyl methane 2,4'- and/or -4,4'-diisocyanate; naphthylene-1,5-diisocyanate; triphenyl methane-4,4',4''-triisocyanate; polyphenyl polymethylene polyisocyanates of the kind obtained by condensing aniline with formaldehyde, followed by phosgenation and described in, for example, British Patents 874,430 and 848,671; m and p isocyanatophenyl-sulphonyl isocyanates as described in U.S. Pat. No. 3,454,606; perchlorinated arylpolyisocyanates of the kind described in U.S. Pat. No. 3,277,138; polyisocyanates containing carbodiimide groups of the kind described in U.S. Pat. No. 3,152,162; diisocyanates of the kind described in U.S. Pat. No. 3,492,330; polyisocyanates containing allophanate groups of the kind described in British Pat. No. 994,890, Belgian Pat. No. 761,626 and published Dutch Pat. No. 7,102,524; polyisocyanates containing isocyanurate groups of the kind described in U.S. Pat. No. 3,001,973, German Pat. Nos. 1,022,789; 1,222,067 and 1,027,394, and German Offenlegungsschrift No. 1,929,034 and 2,004,048; polyisocyanates containing urethane groups of the kind described in Belgian Pat. No. 752,261 or U.S. Pat. No. 3,394,164; polyisocyanates containing acylated urea groups as described in German Pat. No. 1,230,778; polyisocyanates containing biuret groups of the kind described in U.S. Pat. Nos. 3,124,605 and 3,201,372, and British Pat. No. 889,050; polyisocyanates produced by telomerization reactions of the kind described in U.S. Pat. No. 3,654,106; polyisocyanates containing ester groups of the kind described in British Pat. Nos. 956,474 and 1,027,956, in U.S. Pat. No. 3,567,763 and in German Pat. No. 1,231,688; reaction products of the afore-mentioned isocyanates with acetals as described in German Patent 1,072,385 and polyisocyanates containing polymeric fatty acid radicals as described in U.S. Pat. No. 3,455,883.

It is also possible to use the distillation residues containing isocyanate groups accumulating in the commercial production of isocyanates, optionally dissolved in one or more of the afore-mentioned polyisocyanates. It is also possible to use mixtures of any of the aforementioned polyisocyanates.

In general, it is particularly preferred to use readily available polyisocyanates such as 2,4- and 2,6-tolylene diisocyanate and mixtures of these isomers ("TDI"); polyphenyl polymethylene polyisocyanates, of the kind obtained by aniline-formaldehyde condensation and subsequent phosgenation ("crude MDI"); and polyisocyanates containing carbodiimide groups, urethane groups, allophanate groups, isocyanurate groups, urea groups or biuret groups ("modified polyisocyanate").

Other starting components suitable in accordance with the invention for the preparation of the dispersions are compounds having at least two isocyanate-reactive hydrogen atoms and molecular weights of generally from 400 to 10,000. In addition, to compounds containing amino groups, thiol groups or carboxyl groups, compounds containing hydroxyl groups may be used, and in fact, are preferred. Particularly preferred compounds contain 2 to 8 hydroxyl groups and have molecular weights of 800 to 10,000 and preferably from 1000 to 6000. Examples of hydroxyl compounds are, polyesters, polyethers, polythioethers, polyacetals, polycarbonates or polyester amides containing at least 2, generally 2 to 8 and preferably 2 to 4 hydroxyl groups, of the kind generally known and used in the production of homogeneous and cellular polyurethanes.

Examples of suitable polyesters containing hydroxyl groups include reaction products of polyhydric (preferably dihydric, and optionally, trihydric) alcohols with polybasic (preferably dibasic) carboxylic acids. Instead of the free polycarboxylic acids, the corresponding polycarboxylic acid anhydrides or corresponding polycaboxylic acid esters of low alcohols or mixtures thereof can also be used for the production of the polyesters. The polycarboxylic acids can be aliphatic, cycloaliphatic, aromatic and/or heterocyclic, and can be substituted, for example by halogen atoms, and/or can be unsaturated. Examples of useful polycaboxylic acids are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally in admixture with monomeric fatty acids, terephthalic acid dimethyl ester, terephthalic acid-bisglycol ester. Examples of suitable polyhydric alcohols are ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bishydroxy methyl-cyclohexane), 2-methyl-1,3-propane diol, glycerol, trimethylol propane, 1,2,6-hexane triol, 1,2,4-butane triol, trimethylolethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example $\epsilon$-caprolactone or hydroxycarboxylic acids, for example $\omega$-hydroxy caproic acid, may also be used.

The polyethers generally containing two to eight and preferably two or three, hydroxyl groups, suitable for use in accordance with the invention are those of the kind generally known and used in the art and are obtained, for example, by the polymerization of epoxides such as ethylene oxide, propylene oxide, butylene oxide, tetrahydrofuran, styrene oxide or epichlorohydrin on their own (for example in the presence of $BF_3$) or by the chemical addition of these epoxides, optionally in admixture or in succession, to starter components having reactive hydrogen atoms such as water, alcohols or amines such as ethylene glycol, 1,3- or 1,2-propylene glycol, trimethylol propane, 4,4'-dihydroxy diphenyl propane, aniline, ammonia, ethanolamine and ethylene diamine. Sucrose polyethers of the kind described in German Auslegeschrifts Nos. 1,176,358 and 1,064,938 are also suitable for the purposes of the invention. In many cases, it is preferred to use polyethers of the type which contain predominant amounts of primary OH-groups (up to 90% by weight based on all the OH-groups present in the polyether). Polyethers modified by vinyl polymers of the kind obtained for example, by the polymerization of styrene and acrylonitrile in the presence of polyethers (see e.g. U.S. Pat. No. 3,383,351; 3,304,273; 3,523,083; 3,110,695 and German Pat. No. 1,152,536) are also suitable, as are polybutadienes containing OH-groups.

Among the polythioethers useful are the condensation products of thiodiglycol with itself and/or with other glycols, dicarboxylic acids, formaldehyde, aminocarboxylic acids or aminoalcohols. Depending on the co-components, these products are polythio mixed ethers, polythio ether esters, polythio ether ester amides.

Suitable polyacetals include those compounds which can be obtained from glycols such as diethylene glycol, triethylene glycol, 4,4'-dioxethoxy diphenyl dimethyl methane, hexane diol and formaldehyde. Polyacetals for the purpose of the invention can also be obtained by polymerizing cyclic acetals.

Suitable polycarbonates containing hydroxyl groups are those generally known and can be obtained by reacting diols such as 1,3-propane diol, 1,4-butane diol and/or 1,6-hexane diol, diethylene glycol, triethylene glycol, tetraethylene glycol, with diaryl carbonates (such as for example, diphenyl carbonate) or phosgene.

Examples of the polyester amides and polyamides are the predominantly linear condensates obtained from polyvalent saturated and unsaturated carboxylic acids or their anhydrides and polyhydric saturated and unsaturated amino alcohols, diamines, polyamines and their mixtures.

Polyhydroxyl compounds already containing urethane or urea groups and optionally modified natural polyols such as castor oil, carbohydrates and starch, can also be used. Addition products of alkylene oxides with phenol-formaldehyde resins or even with urea-formaldehyde resins can also be used in accordance with the invention.

Examples of the many compounds suitable in accordance with the invention are described, for example, in High Polymers, Vo.. XVI, "Polyurethanes, Chemistry and Technology", by Saunders-Frisch, Interscience Publishers, New York, London, Vol. I, 1962, pages 32 to 42 and pages 44 to 54, and Vol. II 1964, pages 5 to 6 and 198 to 199, and in Kunststoff-Handbuch Vol. VII, Vieweg-Hochtlen, Carl-Hanser-Verlag, Munich, 1966, pages 45 to 71.

It is of course possible to use mixtures of the above-mentioned compounds having at least two isocyanate-reactive hydrogen atoms and a molecular weight in the range from 400 to 10,000, for example, mixtures of polyethers and polyesters.

The solids content (aminoplasts) of the dispersions used in accordance with the invention may vary within wide limits and generally amounts to between 0.5 and 80% by weight and preferably to between 5 and 45% by weight, based on the total weight of the dispersions.

The dispersions thus prepared are high-quality starting materials for the production of polyurethane foams by the isocyanate-polyaddition process. In particular, a considerable increase in the non-inflammability and solvent resistance of the foams is obtained.

Starting components which may be optionally used in accordance with the invention for foam production are also compounds having at least two isocyanate-reactive hydrogen atoms and molecular weights in the range from 32 to 400. In this case, too, the compounds in question are compounds containing hydroxyl groups and/or amino groups and/or thiol and/or carboxyl groups (preferably compounds containing hydroxyl groups and/or amino groups) which serve as chain extenders or crosslinkers. These compounds generally contain from 2 to 8 isocyanate-reactive hydrogen atoms and preferably 2 or 3 reactive hydrogen atoms. Examples of compounds of this type include ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxy methylcyclohexane, 2-methyl-1,3-propane diol, glycerol, trimethylol propane, 1,2,6-hexane triol, trimethylol ethane, pentaerythritol, quinitol, mannitol, sorbitol, diethylene glycol, triethylene glycol, tetraethylene glycol, polyethylenes having a molecular weight of up to 400, dipropylene glycol, polypropylene glycols having a molecular weight of up to 400, dibutylene glycol, polybutylene glycols having a molecular weight of up to 400, 4,4'-dihydroxy diphenyl propane, dihydroxy methyl hydroquinone, ethanolamine, diethanolamine, triethanolamine, 3-aminopropanol, ethylene diamine, 1,3-diaminopropane, 1-mercapto-3-aminopropane, 4-hydroxy- or -amino-phthalic acid, succinic acid, adipic acid, hydrazine, N,N'-dimethyl hydrazine or 4,4'-diaminodiphenyl methane.

In this case, too, it is possible to use mixtures of different compounds having at least two isocyanate-reactive hydrogen atoms and a molecular weight in the range from 32 to 400.

According to the invention, water and/or readily volatile organic substances are often used as blowing agents. Suitable organic blowing agents include acetone, ethyl acetate, halogen-substituted alkanes such as methylene chloride, chloroform, ethylidene chloride, vinylidene chloride, monofluorotrichloromethane, chlorodifluoromethane and dichlorodifluoromethane; butane; hexane; heptane; diethyl ether and the like. A blowing effect can also be obtained by adding compounds which decompose spontaneously at temperatures above room temperature, giving off gases (such as nitrogen). Examples of such compounds are azo compounds such as azoisobutyronitrile. Further examples of blowing agents and details on the use of blowing agents can be found in Kunststoff-Handbuch, Vol. VII, published by Vieweg and Hochtlen. Carl-Hanser-Verlag, Munich 1966, pages 108 and 109, 453 and 507 to 510.

According to the invention, catalysts are also frequently used. Examples of suitable catalysts are those generally known and used in the art. Examples include tertiary amines such as triethylamine, tributylamine, N-methylmorpholine, N-ethylmorpholine, N-cocomorpholine, N,N,N',N'-tetramethyl ethylene diamine, 1,4-diazabicyclo-(2,2,2)-octane, N-methyl-N'-dimethyl aminoethyl piperazine, N,N-dimethyl benzylamine, bis-(N,N-diethylaminoethyl)-adipate, N,N-diethyl benzylamine, pentamethyl diethylene triamine, N,N -dimethyl cyclohexylamine, N,N,N',N'-tetramethyl-1,3-butane diamine, N,N-dimethyl-$\beta$-phenyl ethylamine, 1,2-dimethyl imidazole and 2-methyl imidazole; and mannich bases known per se of secondary amines, such as dimethylamine, and aldehydes, preferably formaldehyde or ketones such as acetone, methyl ethyl ketone, cyclohexanone and phenols, such as phenol, nonyl phenol, and bis-phenol.

Examples of tertiary amines useful as catalysts, which contain hydrogen atoms capable of reacting with isocyanate groups are triethanolamine, triisopropanolamine, N-methyl diethanolamine, N-ethyl diethanolamine, N,N-dimethyl ethanolamine and their reaction products with alkylene oxides, such a propylene oxide and/or ethylene oxide.

Other suitable catalysts are silaamines containing carbon silicon bonds of the kind described in U.S. Pat. No. 3,620,984. Specific examples include, 2,2,4-trimethyl-2-silamorpholine or 1,3-diethyl-amino-ethyl tetramethyl disiloxane.

Suitable catalysts also include nitrogen-containing bases such as tetraalkyl ammonium hydroxides; alkali hydroxides such as sodium hydroxide; alkali phenolates such as sodium phenolate and alkali alcoholates such as sodium methylate. Hexahydrotriazines can also be used as catalysts.

According to the invention, organometallic compounds and especially organotin compounds, can also be used as catalysts. Preferred organotin compounds are tin-(II)-salts of carboxylic acids, such as tin(II)-acetate, tin-(II)-octoate tin-(II)-ethyl hexoate and tin-(II)-laurate and the dialkyl tin salts of carboxylic acids such as, for example, dibutyl tin diacetate, dibutyl tin dilaurate, dibutyl tin maleate or dioctyl tin diacetate. All the above-mentioned catalysts may of course also be used in the form of mixtures.

Further examples of catalysts for use in accordance with the invention and details on the way in which the catalysts work can be found in Kunststoff-Handbuch, Vol. VII, published by Vieweg and Hochtlen, Carl-Hanser-Verlag, Munich 1966, on pages 96 to 102.

The catalysts are generally used in quantites of from about 0.001 to 10% by weight, based on the quantity of compounds having a molecualr weight of 400 to 10,000.

According to the invention, surface-active additives (emulsifiers and foam stabilizers) can also be used. Examples of emulsifiers are the sodium salts of castor oil sulphonates; fatty acids or salts of fatty acids with amines such as diethyl amine/oleic acid or diethanolamine/stearic acid. Alkali or ammonium salts of sulphonic acids, such as those of dodecyl benzene sulphonic acid or dinaphthyl methane disulphonic acid or fatty acids, such as ricinoleic acid, or polymeric fatty acids, can also be used as surface-active additives.

Suitable foam stabilizers are, in particular, water-soluble polyether siloxanes. These compounds are generally of such a structure that a copolymer of ethylene oxide and propylene oxide is attached to a polydimethyl siloxane radical. Foam stabilizers of this kind are described in U.S. Pat. Nos. 2,834,748; 2,917,480 and 3,629,308.

According to the invention, it is also possible to use reaction retarders, (for example substances with an acid reaction such as hydrochloric acid or organic acid halides) cell regulators known, such as paraffins, fatty alcohols or dimethyl polysiloxanes; pigments and/or dyes; flameproofing agents such as tris-chloroethyl phosphate or ammonium phosphate and polyphosphate; stabilizers against the effects of ageing and weather; plasticizers; substances with fungistatic and bacteriostatic effects; and fillers such as barium sulphate, kieselguhr, carbon black or prepared chalk.

Further examples of the surface-active additives, foam stabilizers, cell regulators, reaction retarders, stabilizers, flameproofing agents, plasticizers, dyes, fillers, substances having fungistatic and bacteriostatic effects useful herein and also details on the way in which these additives are to be used and how they work, can be found in Kunststoff-Handbuch, Vol. VII, published by Vieweg and Hochtlen, Carl-Hanser-Verlag, Munich 1966, pages 103 to 113.

According to the invention the reaction components can be reacted by the single-stage process by the prepolymer process or by the semi-prepolymer process, in many cases using machines of the kind described for example in U.S. Pat. No. 2,764,565. Particulars of processing equipment suitable for use in accordance with the invention can be found for example on pages 121 and 205 of Kunststoff-Handbuch, Vo. VI, published by Vieweg and Hochtlen, Carl-Hanser-Verlag, Munich 1966.

According to the invention, the foams are often produced by foaming in molds. To this end, the reaction mixture is introduced into a mold. Suitable mold materials are metals, such as aluminum, or plastics such as epoxide resin. In the mold, the foamable reaction mixture foams and forms the molding. In-mold foaming may be carried out in such a way that the molding has a cellular structure at its surface, although it may also be carried out in such a way that the molding has a compact skin and a cellular core. According to the invention, it is possible to introduce the foamable reaction mixture into the mold in such a quantity that the foam formed just fills the mold. However, it is also possible to introduce into the mold, more favorable reaction mixture than is required for filling the mold with foam. This technique is known as "overcharging" and is described in U.S. Pat. Nos. 1,178,490 and 3,182,104.

Where foaming is carried out in molds, "external release agents", such as silicone oils, may frequently be used. It is also possible, however, to use so-called "internal release agents", optionally in admixture with external release agents of the type described in German Offenlegungsschrifts Nos. 2,121,670 and 2,307,589.

According to the invention, it is also possible to produce cold-hardening foams (see e.g. British Pat. No. 1,162,517 and German Offenlegungsschrift No. 2,153,086).

However, foams may also be produced by block foaming or by the double conveyor-belt process generally known in the art.

The foams obtainable in accordance with the invention can be used, for example, as upholstery materials in the automobile and furniture industries.

EXAMPLE 1

Embodiments (a), (b) and (c) of this example describe the production of polymethylene ureas in aqueous medium and their subsequent dispersion in relatively high molecular weight polyhydroxyl compounds:

Embodiment a:

Apparatus: 5 liter enamel vessel, stirrer, thermometer, reflux condenser 600 parts by weight of urea (10 mols) are dissolved at 20° to 30° C. in 1500 parts by weight of water in a mixer. The solution is filtered and drawn into an enamel vessel. 1000 parts by weight of a filtered 30% by weight aqueous formaldehyde solution (=10 mols) are then quickly added to the aqueous urea solution with thorough stirring. After stirring for 10 minutes, 34 parts by weight of 10% by weight aqueous hydrochloric acid as catalyst are added with vigorous stirring. A total of 3134 parts by weight of reactants had been used.

The exothermic reaction by which the polymethylene urea is formed begins after about 30 seconds after the catalyst has been added. The vessel should not be cooled. The maximum temperature (65°–68° C.) is reached in 6 minutes. The finely divided dispersion formed is stirred for about 5 hours, and cooled to 25° C. About 34 parts by weight of 10% by weight sodium hydroxide solution was then added in order to neutralize the mixture.

The pigment-like product is then filtered and stirred into 2000 parts by weight of water to form another dispersion. Approximately 48 parts by weight of unreacted formaldehyde are converted into hexamethylene tetramine by the addition of 313 parts by weight of gaseous ammonia. The finely divided, but readily filterable polymethylene urea is then filtered off, washed with water, stirred up three times with approximately 1500 parts by weight of water, filtered and dried at 50° to 70° C. in a vacuum drying cabinet.

Particle size: 300–400$\mu$. Yield: 681 parts by weight, corresponding to approximately 94.5% of the theoretical.

(b) The procedure is exactly the same as in Example (a), except that 500 parts by weight of the water used in (a) is replaced by glycerol. Otherwise the procedure is as described in (a). Analytical data show that, in addition to free N-methylol groups, the powder-form polymethylene ureas obtained contain, at their terminal groups, approximately 35% by weight of polymethylene ureas with N-methylol ether having with the idealized formula:

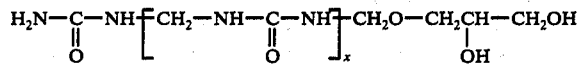

$x = 3-12$

By virtue of the glycerol residue incorporated in them, the polycondensates of this example accumulate in a greatly reduced particle size of about 110 to 130μ by comparison with (a). These pigment-like powders are only soluble in methanolic Li I-solutions.

(c) The procedure is exactly the same as described in Example (a), except that 500 parts by weight of the water are replaced by cane sugar. Analytical data show that, in addition to free methylol groups, the powder-form polymethylene ureas obtained contain at their terminal groups approximately 40% by weight of terminal saccharose groups attached in the manner of acetals. Owing to the dispersing effect of the saccharose residue, the polycondensates of this example accumulate in a considerably reduced particle size of from 80 to 110μ by comparison with (a).

The polymethylene ureas of embodiment (a), (b) and (c) freed from traces of formaldehyde by means of ammonia water, are dried at 70° C. in a vacuum drying cabinet and subsequently ground in a polyhydroxyl polyether of the following composition (20 parts by weight of the aminoplast powders (a), (b), and (c) being ground in 80 parts by weight of polyether).

Propylene oxide was initially polyadded on trimethylol propane as starter in the presence of catalytic quantities of sodium alcoholate. Ethylene oxide was then polyadded in a second phase. The liquid polyether contains primary hydroxyl groups, while the polyadded propylene oxide and ethylene oxide are present in a ratio by weight of 83:17. The polyether used has an OH-number of about 35. The polyether has a viscosity of 870 cP at 20° C.

Dispersions having a particle size of from 3 to 14μ are obtained in this way. Dispersions (a'), (b') and (c') can be smoothly foamed without shrinking in a small-scale foaming test without any formaldehyde being reformed from the redispersible dispersions, even after storage times of 8 months.

EXAMPLE 2

The polymethylene ureas produced in aqueous medium in variants (a), (b) and (c) of Example 1, which were ground in the form of 20% dispersions in the polyether mentioned, are foamed as follows:

100 parts of the dispersion prepared in Example 1a, 2.7 parts of water, 1.0 parts of a standard commercial-grade polyether polysiloxane stabilizer (L520 of Union Carbide Corporation), 0.2 part of triethylene diamine and 0.2 part of a tin (II) salt of 2-ethyl caproic acid, are mixed together. 38.4 parts of tolylene diisocyanate (80% 2,4- and 20% 2,6-isomer) are added to this mixture, followed by thorough mixing using a high-speed stirrer. Foam formation begins after an induction time of 10 seconds, resulting in the formation of a white, soft elastic polyurethane foam which has open cells, a density of 40 kg/m³ and a compression hardness (DIN 53 577) at 40% compression of 57 p/cm². The foam obtained is more resistant to yellowing under the effect of light and industrial gases than a comparison sample produced from the corresponding aminoplast-free polyether. The rate at which a strip measuring 10 × 1 × 0.5 cm burns after ignition is considerably reduced. The foam has become self-extinguishing.

100 parts of the dispersion prepared in Example 1b, 2.7 parts of water, 1.0 part of a standard commerical-grade polyether polysiloxane stabilizer (L520 of Union Carbide Corporation), 0.2 part of triethylene diamine and 0.2 part of a tin (II) salt of 2-ethyl caproic acid are mixed together. 37.3 parts of tolylene diisocyanate (80% 2,4- and 20% 2,6-isomer) are added to this mixture, followed by thorough stirring using a high speed-stirrer. Foam formation begins after an induction time of 10 seconds, resulting in the formation of a white soft-elastic polyurethane foam which has open cells and a density of 38 kg/m³.

The foam obtained is more resistant to yellowing under the effect of light and industrial gases than a comparison sample produced from the corresponding aminoplastfree polyether.

100 parts of the dispersion prepared in Example 1c, 2.9 parts of water, 1.0 part of the above mentioned standard commercial-grade polyether polysiloxane stabilizer, 0.2 part of triethylene diamine and 0.2 part of a tin (II) salt of 2-ethyl caproic acid, are mixed together. 39.8 parts of tolylene diisocyanate (80% 2,4- and 20% 2,6-isomer) are added to this mixture, followed by thorough stirring using a high-speed stirrer. Foam formation begins after an induction time of 10 seconds, resulting in the formation of a white soft elastic polyurethane foam which has open cells and a density of 38 kg/m³. The foam obtained is more resistant to yellowing than a comparison sample produced from the corresponding aminoplastfree polyether.

EXAMPLE 3

After being ground in polyhydroxyl polyethers, the polymethylene ureas produced in accordance with variants (a), (b) and (c) of this Example, with an increased hydrazo dicarbonamide content

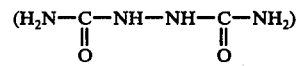

[embodiment (a)], with new finely divided combination fillers with condensed polysilica [embodiment (b)] and with titanium dioxide [embodiment (c)], which are produced in aqueous medium, optionally in the presence of ethylene glycol, glycerol or triethylene glycol, are in the form of dispersions which, after foaming, show a particularly low degree of inflammability by comparison with elastic filler-free foams.

(a) The production of (a) is carried out in the same way as described in Example 1, but using 1 mol of urea, 1 mol of hydrazodicarbonamide, 6 mols of formaldehyde at 60° to 80° C. and using 15 parts by weight of o-phosphoric acid as catalyst.

(b) The production of (b) is carried out in the same way as described in Example 1 from 1 mol of urea, 1 mol of formaldehyde, 120 parts by weight of waterglass solution (30% by weight), condensation initially being carried out for 0.5 hour at room temperature. Momomethylol compounds of the urea are formed. This is followed by the precipitation at 60° to 90° C. of polymethylene ureas and condensed polysilicas by the addition of 14 parts by weight of 85% phosphoric acid accompanied by the introduction of $CO_2$ gas. Water may be partly replaced (up to 30–40% by weight) by diethylene glycol, resulting in the formation of polymethylene ureas partly containing

at their terminal groups.

(c) The dispersion (c) are produced in the same way as described in Example 1 from 1 mol of urea and 1.5 mol of formaldehyde, 1.5 mol of titanium tetrachloride (or 0.8 mol of antimony trichloride) as catalyst and titanium dioxide former (or antimony trioxide former) being added dropwise at 70° C. to the aqueous solution of 1 mol of urea and 1.5 mol of formaldehyde. Hydrolysis of the titanium tetrachloride (or antimony trichloride) liberates HCl, so that polycondensation to form the polymethylene ureas takes place quickly. If the titanium tetrachloride is replaced by antimony pentachloride, the corresponding insoluble antimony oxides are formed in addition to the polymethylene ureas. If, in these mixtures, 300 parts by weight of water are replaced by triethylene glycol, the polymethylene ureas precipitated partly contain —NH—CH$_2$—O—(CH$_2$-CH$_2$-O)$_3$H groups.

(d) The procedure is exactly the same as described in (b) of this example, except that the waterglass solution is replaced by 1.8 mol of a concentrated aqueous calcium chloride solution, and condensation carried out over a period of 30 minutes at 50° C. Condensation is then continued for another 6 hours at 90° C. following the addition of an aqueous solution of 160 parts by weight of sodium hydroxide in 300 parts by weight of water. The polymethylene urea condensate containing approximately 50% by weight of calcium hydroxide is filtered off and the dried product ground to approximately 5μ.

(e) The procedure is exactly the same as described in (b) of this example, except that the polymethylene ureas are produced by the dropwise addition of approximately 400 parts by weight of an approximately 30% by weight aluminum formate solution in concentrated formic acid and not by the addition of phosphoric acid as catalyst. Finely powdered polymethylene ureas and aluminum silicates are formed over a period of 6 hours during which about another 400 parts by volume of water are added. The fillers are filtered, washed until neutral, dried in vacuo at 80° C. and subsequently ground to form approximately 20% by weight dispersions in the liquid polyether of Example 2.

When the approximately 20% dispersions according to a, b, c, d and e are foamed in accordance with Example 2, foams which are self-extinguishing are obtained without any signs of shrinkage.

EXAMPLE 4

300 parts by weight of a trimethylol propane-started polypropylene glycol modified with ethylene oxide (containing about 67% of terminal primary hydroxyl groups) with an OH-number of 28, 9 parts by weight of water, 0.6 part by weight of triethylene diamine, 2.5 parts by weight of N-methyl morpholine, 0.6 part of tin dioctoate, 0.15 part by weight of a standard commerical-grade polyether polysiloxane stabilizer (L520 of Union Carbide Corporation), are mixed together. A freshly prepared dispersion of 110 parts by weight of polymethylene ureas having a particle size of approximately 5 in 117.5 parts by weight of isocyanate mixture of 80% by weight of tolylene diisocyanate (80% 2,4- and 20% 2,6-isomer) and 20% by weight of a polymeric 4,4'-diisocyanato diphenyl methane, is added to this mixture, followed by thorough stirring using a high-speed stirrer. Foam formation begins after an induction time of 10 seconds and is over after a rise time of 85 seconds. The highly elastic foam obtained contains approximately 27.5% by weight of polymethylene ureas. The foam is self-extinguishing.

What is claimed is:

1. In a process for the production of foams comprising reacting polyisocyanates with compounds containing at least two isocyanate-reactive hydrogen atoms and having molecular weights of from 400 to 10,000 in the presence of blowing agents, the improvement wherein the polyisocyanates and/or the compounds having at least two isocyanate-reactive hydrogen atoms and molecular weights of from 400 to 10,000 are in the form of sedimenting, redispersible dispersions containing homogeneous aminoplasts as disperse phase, said dispersions having a solids content of from 5 to 45%.

2. The process of claim 1, wherein polyhydroxyl polyethers are used as the compounds containing at least two isocyanate reactive hydrogen atoms and having molecular weights in the range from 400 to 10,000.

3. A process as claimed in claim 1 wherein the aminoplast condensates contain up to 60% by weight based on the mixture as a whole, of finely divided polysilicas, titanium dioxide, antimony trioxide and/or aluminum silicates.

4. Foams obtainable by the process claimed in claim 1.

* * * * *